United States Patent
Semenuk

[11] Patent Number: 5,865,144
[45] Date of Patent: Feb. 2, 1999

[54] VENTILATED CAGE FOR LABORATORY ANIMAL

[76] Inventor: Michael Semenuk, 63 Prospect Bay Dr., W., Grasonville, Md. 21638

[21] Appl. No.: 920,732

[22] Filed: Aug. 29, 1997

[51] Int. Cl.⁶ .................................................. A01K 7/00
[52] U.S. Cl. ........................................... 119/456; 119/493
[58] Field of Search .................................. 119/416, 417, 119/418, 419, 456, 458, 493, 500

[56] References Cited

U.S. PATENT DOCUMENTS

| | | | |
|---|---|---|---|
| Re. 32,113 | 4/1986 | Harr | 119/15 |
| D. 351,259 | 10/1994 | Semenuk et al. | D30/119 |
| 2,467,525 | 4/1949 | Fricke | 119/15 |
| 3,063,413 | 11/1962 | Fuller et al. | 119/18 |
| 3,397,676 | 8/1968 | Barney | 119/15 |
| 3,464,388 | 9/1969 | Stout | 119/418 |
| 3,919,978 | 11/1975 | Schaefer | 119/500 |
| 3,924,571 | 12/1975 | Holman | 119/419 |
| 4,085,705 | 4/1978 | Gland et al. | 119/17 |
| 4,154,196 | 5/1979 | Gass | 119/17 |
| 4,201,153 | 5/1980 | Nace | 119/3 |
| 4,402,280 | 9/1983 | Thomas | 119/15 |
| 4,435,194 | 3/1984 | Picard et al. | 55/96 |
| 4,480,587 | 11/1984 | Sedlacek | 119/15 |
| 4,526,133 | 7/1985 | LoMaglio | 119/17 |
| 4,528,941 | 7/1985 | Spengler | 119/15 |
| 4,798,171 | 1/1989 | Peters et al. | 119/15 |
| 4,844,018 | 7/1989 | Niki | 119/72.5 |
| 4,869,206 | 9/1989 | Spina | 119/17 |
| 4,940,017 | 7/1990 | Niki et al. | 119/18 |
| 4,989,545 | 2/1991 | Scheaffer et al. | 119/17 |
| 5,003,922 | 4/1991 | Niki et al. | 119/15 |
| 5,048,459 | 9/1991 | Niki et al. | 119/17 |
| 5,148,766 | 9/1992 | Coiro, Sr. et al. | 119/17 |
| 5,307,757 | 5/1994 | Coiro, Sr. et al. | 119/17 |
| 5,311,836 | 5/1994 | Sheaffer et al. | 119/17 |
| 5,400,744 | 3/1995 | Coiro, Sr. et al. | 119/417 |

Primary Examiner—Thomas Price
Attorney, Agent, or Firm—Leonard Bloom

[57] ABSTRACT

A cage system for laboratory animal care has a plastic cage with a molded perforated-bottom, a snap-on plenum cage top, a cage top feeder lid and a snap on waste tray. The floor of the cage is shaped with rounded perforations and domed protrusions to deflect both liquid and solid waste down to the attached waste tray. A filtered air supply is introduced into the lid of the cage and passes through orifices in the bottom of the lid, flowing laminarly through the body of the cage and out perforations in the floor over the waste tray. A water supply system for the cage is provided. No bedding is required in the cage. The system is air tight and air in any one cage is isolated from air in all other cages in the system which can be mounted on a rack.

15 Claims, 7 Drawing Sheets

VENTILATED CAGE FOR LABORATORY ANIMAL

BACKGROUND OF THE INVENTION

The present invention relates to caging systems for laboratory animal care and more particularly to a cage and system which has controlled ventilation, waste containment and does not require bedding.

Most all existing ventilated rodent cage systems are made with plastic solid-bottom cages. Clear cages are used so it is possible to inspect the condition of the inside of the cage without disturbing the animals. The cage ensemble generally consists of a metal wire bar lid containing a feed hopper and water bottle capabilities and a plastic top that holds a piece of filter media. The wire bar lid is convenient to use because feed and water bottles in a cage can be moved to a clean cage in one motion. The cages are contained in a rack that holds a plurality of cages either single or double sided. An automatic water system introduces water into the cage for the rodent using lixits or water valves located either outside or inside the cage. It must be monitored for proper water pressure and must be flushed periodically. Problems of leakage, high intracage humidity levels and cage flooding are associated with automatic watering systems. A plenum, either a separate duct system or made up of components of the rack (i.e. the shelves or the tubing uprights), supply the cage with filtered air through a cage mounted air supply diffuser. The front of the cage, perimeter of the cage lid and the cage body (where the leakage occurs) is open to the environment of the animal room. The air flow is either transversely across the cage or from an inlet in the side or top of the cage to an outlet in the junction of the top and body or top of the cage. A removable bottom portion for animal waste has been disclosed but air flow through the waste tray has not been reported.

Exhausted air is drawn either through a plenum system or into a "U" shaped metal exhaust collar surrounding three sides of each cage or a metal or plastic canopy. It is drawn into a horizontal exhaust manifold on each shelf, travels up the vertical exhaust plenum, then finally into a filtered exhaust system. This system, designed for limited capture of exhausted cage air, allows contaminated air to escape into the room from the cage lid perimeter and may present health problems for personnel. The systems scavenge room air and introduce air into the room, thus disturbing the macroenvironment. Present systems allow the pressurized air to blow any contaminants on the filter media into the room. Another type allows contaminants on the filter media to blow into the cage.

The applicant is aware of the following U.S. patents which are related to cages for laboratory animals:

| Inventor(s) | U.S. Pat. No. |
| --- | --- |
| Fricke | 2,467,525 |
| Fuller et al | 3,063,413 |
| Barney | 3,397,676 |
| Holman | 3,924,571 |
| Gland et al | 4,085,705 |
| Gass | 4,154,196 |
| Nace | 4,201,153 |
| Thomas | 4,402,280 |
| Picard et al | 4,435,194 |
| Sedlacek | 4,480,587 |
| LoMaglio | 4,526,133 |
| Spengler | 4,528,941 |
| Peters et al | 4,798,171 |
| Niki | 4,844,018 |
| Spina | 4,869,206 |
| Niki et al | 4,940,017 |
| Sheaffer | 4,989,545 |
| Niki et al | 5,003,022 |
| Niki et al | 5,048,459 |
| Coiro, Sr. et al | 5,148,766 |
| Coiro, Sr. et al | 5,307,757 |
| Sheaffer et al | 5,311,836 |
| Harr | Re 32,113 |
| Semenuk | D 351,259 |

Also applicable is U.S. patent application Ser. No. 29/033,313, to Semenuk.

Current ventilated caging systems, of which the applicant is aware, for laboratory animal care and use in biomedical research/testing is suboptimal because of the lack of environmental control. Also, animal activity over contact bedding material, husbandry techniques and laboratory procedures generate aerosols and allergens that spread through cage leakage into the work area and pose a risk of contamination to the animals and to the workers. In addition to suspension of particulates, chilling and dehydration of neonates, hairless and nude strains, existing ventilated racks have provoked animal losses due to hypothermia. While the systems currently in use may provide some biological exclusion and save labor, the use of bedding material, the lack of animal comfort, the leakage problem, and the high cost of maintenance pose serious problems in research.

In present systems, bedding and nesting materials are placed directly on the floor of the solid-bottom cages, since rodents are nesting and burrowing animals. The primary requirements of bedding materials are: (1) the material must not be harmful to the animal; (2) it must be capable of absorbing moisture without causing dehydration of newborn animals, (3) it must not create excessive dust, (4) it must be economical to use and dispose of. So far, existing bedding materials fail to achieve these standards. A major goal is eliminating the cost of bedding and bedding-related activities including bedding ordering, receiving, storage, dispensing, autoclaving, dust removal, bedding dumping, cage-scraping, bagging, disposal and finally removal of soiled bedding. Dispensing of used bedding can engender both problems of storage and aerosol contamination including allergen exposure. Expensive engineering and operation systems are required to prevent these problems. Modern bedding disposal systems are basically vacuums, which prevent contaminated particles from getting into the air that workers breathe. The location of such systems throughout a facility and the transportation of waste bedding are major operational expenses. Moreover as greater demands are put on available space, clean bedding storage add a burden to husbandry-related costs. Thus, there is a need for a laboratory animal cage and a system of cages which solve these problems.

BRIEF SUMMARY OF THE INVENTION

It is an object of the invention to provide a cage for laboratory animal care which has a laminar air flow from top to bottom to permit a healthy environment.

It is a further object of the invention to provide a cage for laboratory animal care which permits waste products to pass through the floor of the cage and requires no bedding in the cage.

It is still another object of the present invention to provide a cage for laboratory animal care which can exhaust excess water automatically preventing cage flooding.

It is yet another object of the present invention to provide a system of cages in a rack in which the air flow through each individual cage is controlled, adjustable by the user and there is no cross contamination between the cages.

It is still a further object of the present invention to provide a cage for laboratory animal care to permit optimal animal housing flexibility, protect animal and occupational health by providing a barrier at cage level for exclusion, containment or both, validate data reproducibility; and provide for optimal animal comfort and well-being. It will also avoid animal limb soreness and stiffness as found in wire bottom cages, promote rapid waste desiccation, eliminate waste contaminants accumulation, save husbandry-related costs, and convey a positive image to the public.

In accordance with the teaching of the present invention there is disclosed a ventilated cage system for laboratory animal care including a plurality of individual cages mounted in a rack. Each cage has an integral body with a separate lid connected thereto. Each lid has a bottom surface having a plurality of orifices formed therein. An inlet port is formed in each lid. Each body has a perforated floor. Each cage has a detachable waste tray connected beneath the perforated floor. Each cage is air tight. An outlet port is formed in the waste tray. An air supply having a filter therein is provided. The air supply introduces filtered air into the inlet port of the respective lid of each cage. The air flows laminarly from the lid of each cage, through each cage, through the perforated floor of each cage, through the waste tray of each cage, through the outlet port of each waste tray and through the filter. In this manner, fresh filtered air is maintained in each cage, waste air is removed from each cage and cage-to-cage contamination is prevented.

In another aspect, there is provided a cage for laboratory animal care. The cage does not require bedding therein. The cage includes a body having four walls and a bottom surface defining living space for the animal. The bottom surface has a plurality of spaced-apart perforations formed therein. A waste tray is detachably connected beneath the perforated floor of the body. The waste tray has an outlet port formed therein. A lid is connected to the body, the lid having a bottom surface having a plurality of spaced-apart orifices formed therein. The orifices communicate with the living space for the animal. The lid has an inlet port formed therein. A clean air supply is connected to the inlet port wherein the clean air flows through the inlet port into the lid and through the orifices in the bottom surface of the lid. The clean air flows laminarly through the living space for the animal through the perforated floor, across the waste tray and out the outlet port. The air flow removes from the cage, particulate matter, allergens and gases associated with waste products.

These and other objects of the present invention will become apparent from a reading of the following specification taken in conjunction with the enclosed drawings.

DESCRIPTION OF THE PREFERRED EMBODIMENTS

Referring now to FIGS. 1–5, a plurality of cages 10 are supported on a rack 12. Preferably, the rack 12 is a frame mounted on wheels with a plurality of cage suspension brackets having one or more cages 10 on each bracket.

Figure 1:
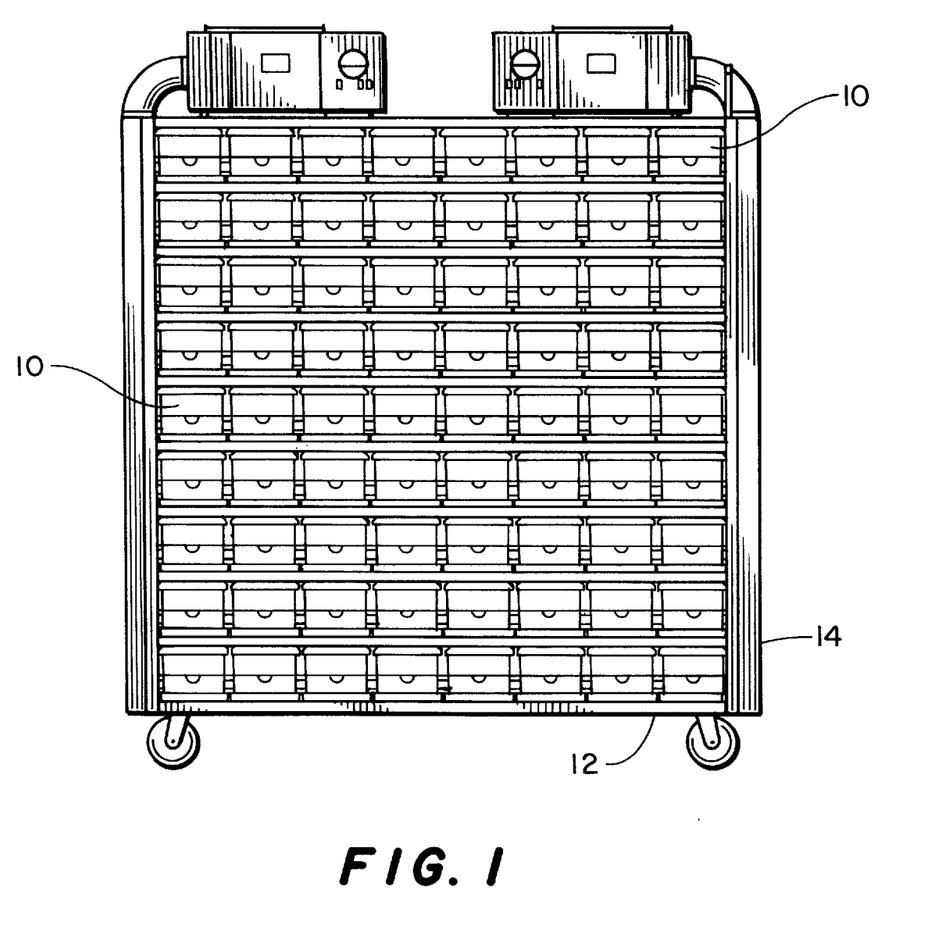
FIG. 1 is a front elevation view of a rack in which are mounted a plurality of cages for laboratory animal care of the present invention.
Figure 2:
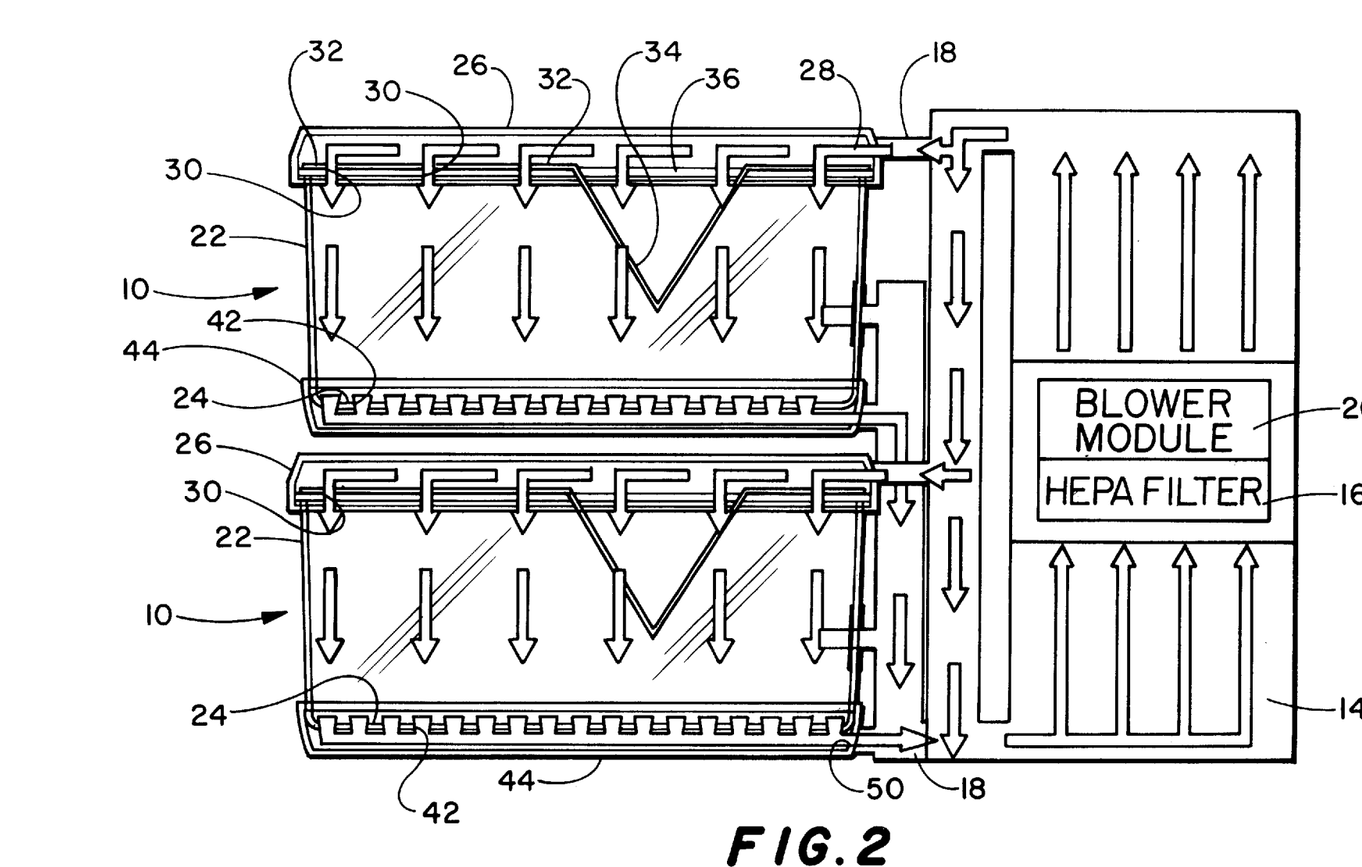
FIG. 2 is a side elevation view of two cages mounted vertically and connected to the air supply system.
Figure 3:
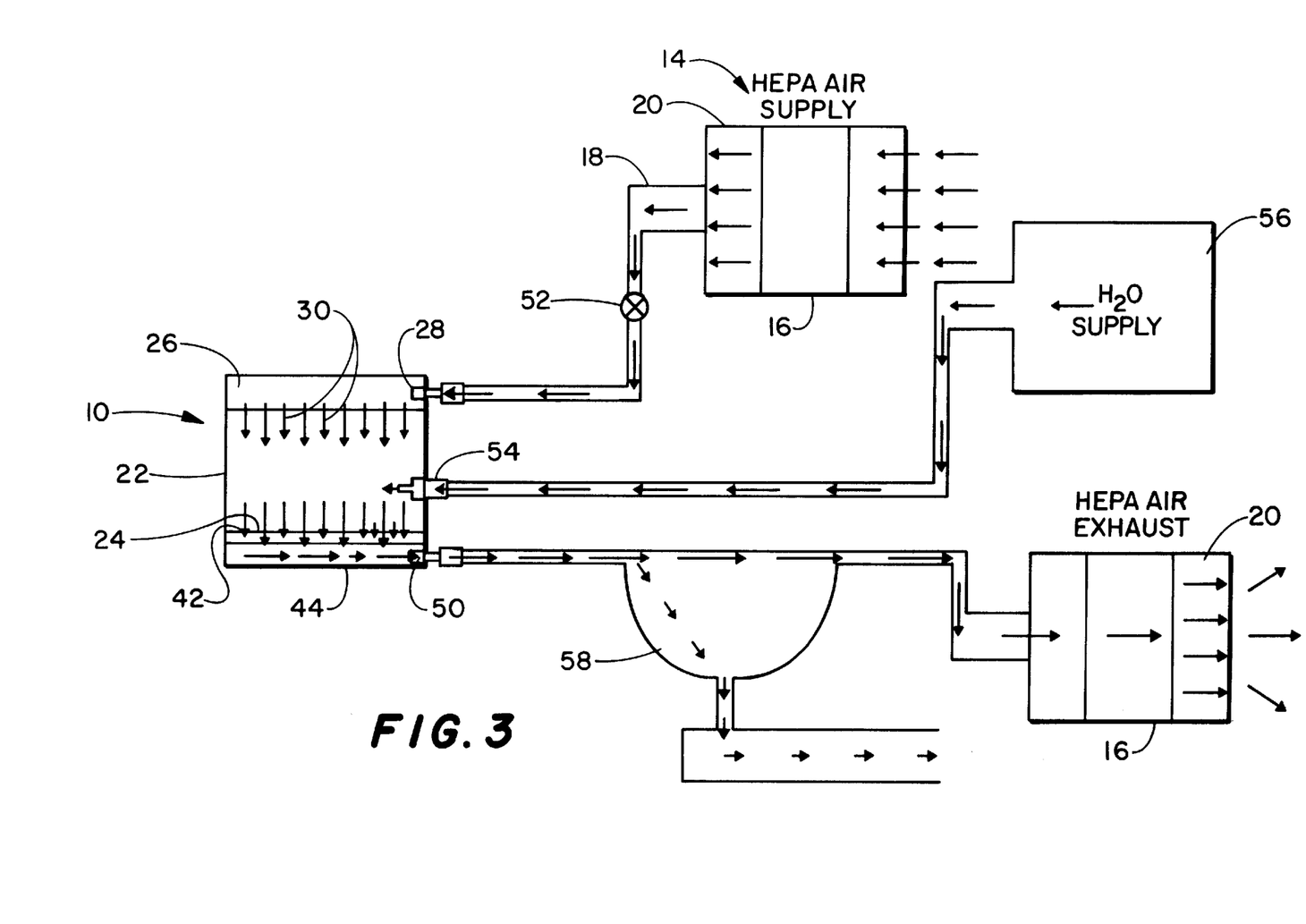
FIG. 3 is a schematic diagram of the ventilated cage system of the present invention.

Each cage 10 is individually connected to an air supply 14 which serves all of the cages 10 in the rack 12. A filter 16 is provided in the air supply. The filter may be a HEPA filter and may also include a prefilter. A blower 20 is disposed in the air supply system to move the air through the cages 10 and the filter 16. The filtered air enters a manifold 18 which is connected by hoses to the individual cages 10. The filter system removes particulate matter and pathogens larger than 0.003 microns in size.

Figure 4:
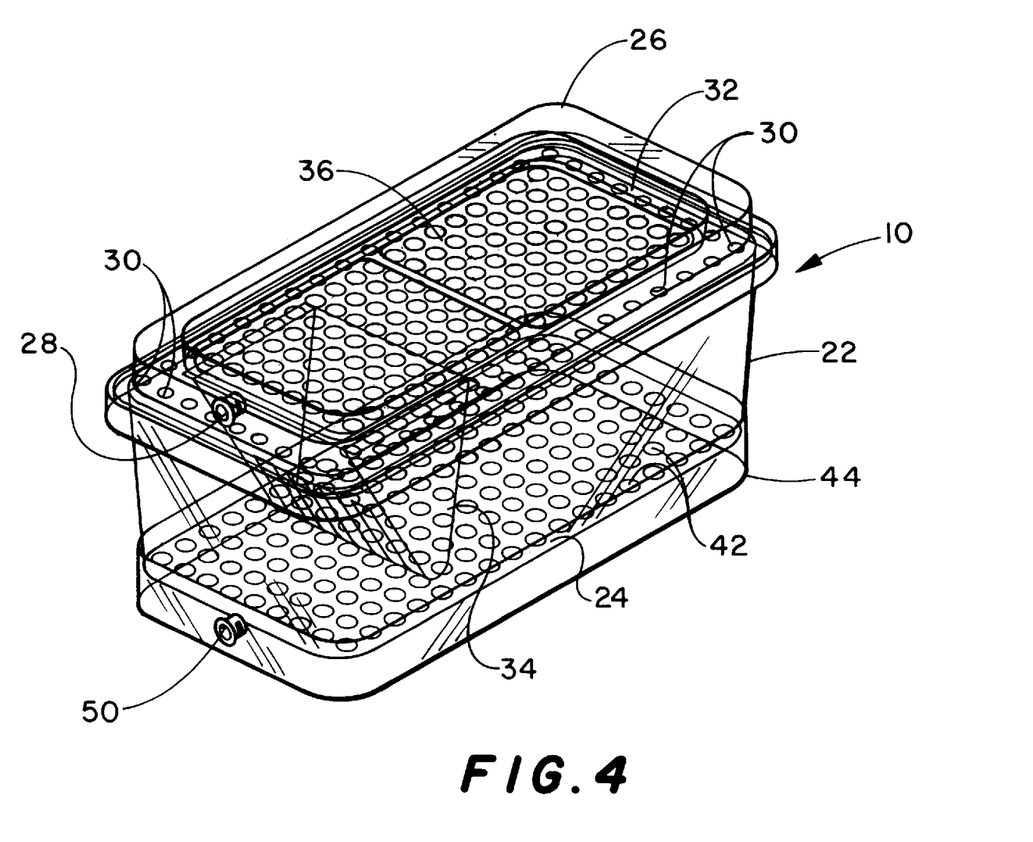
FIG. 4 is a perspective view of the cage.
Figure 5:
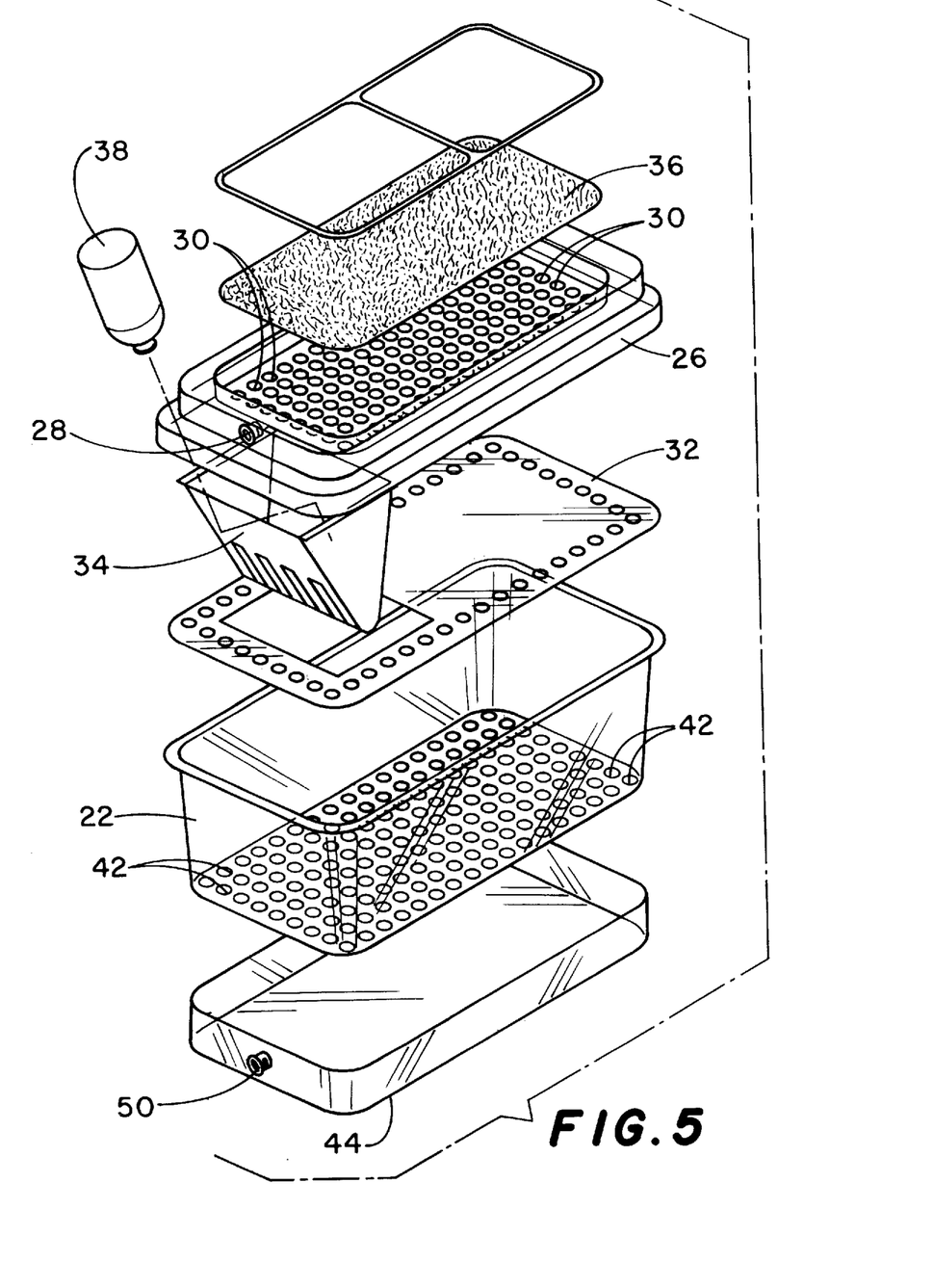
FIG. 5 is an exploded view of the cage.

Each cage 10 has a body 22 having four walls and a bottom surface 24 to define a living space for the laboratory animals A separate lid 26 is removably connected to the top of each body 22. An air inlet port 28 is formed in each lid 26. The bottom surface of each lid 26 has a plurality of spaced-apart orifices 30 formed therein. Preferably, the orifices are distributed over the entire area of the bottom surface of each lid 26.

It is preferred that all corners and the intersections of walls and bottom surface of the cage be rounded to reduce the accumulation of dirt and waste and to facilitate cleaning of the cage. It is preferred that the body of the cage be made of high temperature plastic and that the cage be transparent to permit observation of the animal within the cage.

It is preferred that a feeder plate 32 be disposed between the lid 26 and the body 22 of each cage 10. The feeder plate 32 may be a frame structure which has an angled portion 34 which extends downwardly into the living space of the animal within the body 22 of the cage. The angled portion 34 may have a "V" shape. The feeder plate may be metal or plastic. The feeder plate 32 supports containers of food, water and/or special liquid supplements 38 for the animal. The perforated feeder plate 32 also optimally acts as an air diffuser creating a plenum when coupled with the lid 26.

Figure 7:
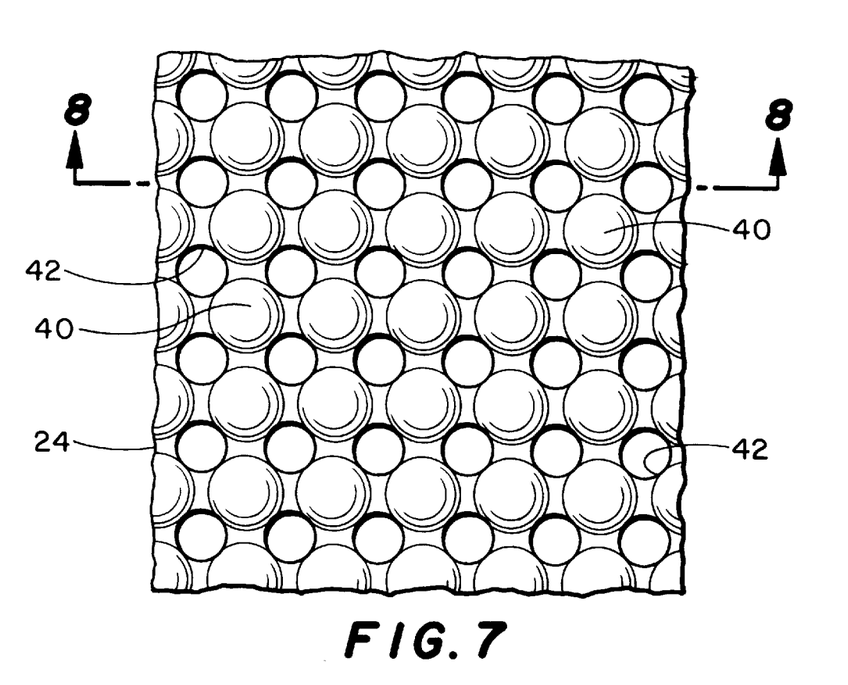
FIG. 7 is a top plan view of a portion of the bottom of the cage.
Figure 8:
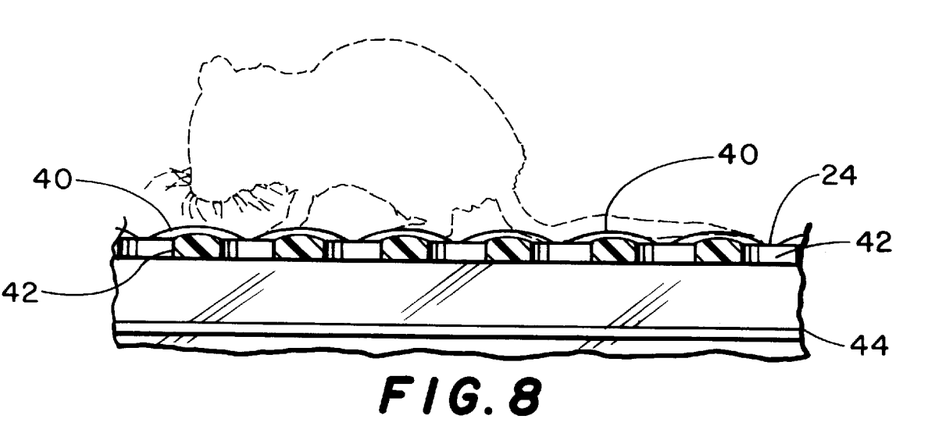
FIG. 8 is a cross-section view of a portion of the bottom of the cage along the lines 8—8 of FIG. 7 showing an animal in the cage.

The body surface (or floor) 24 of the cage 22 is perforated. The floor 24 is formed having a plurality of spaced-apart raised domes 40. Each dome is disposed among a plurality of spaced-apart perforations 42 (FIGS. 7 and 8). Although not limited to these sizes, it has been found that a satisfactory floor has domes 40 which are approximately 0.5 inches in diameter and approximately 3/32 inch in height above the surface of the floor. The perforations 42 are approximately 5/16 inch in diameter. Solid and liquid waste from the animal is deflected from the domes 40 and through the perforations 42 into the waste tray 44. The floor 24 of the present invention replaces wire floors as used in cages of the prior art and solves problems which were caused by the wire floors such as injury to the feet of the animals.

The waste tray 44 is a tray having walls and a bottom which covers the entire bottom surface 24 of the cage 10.

Figure 6:
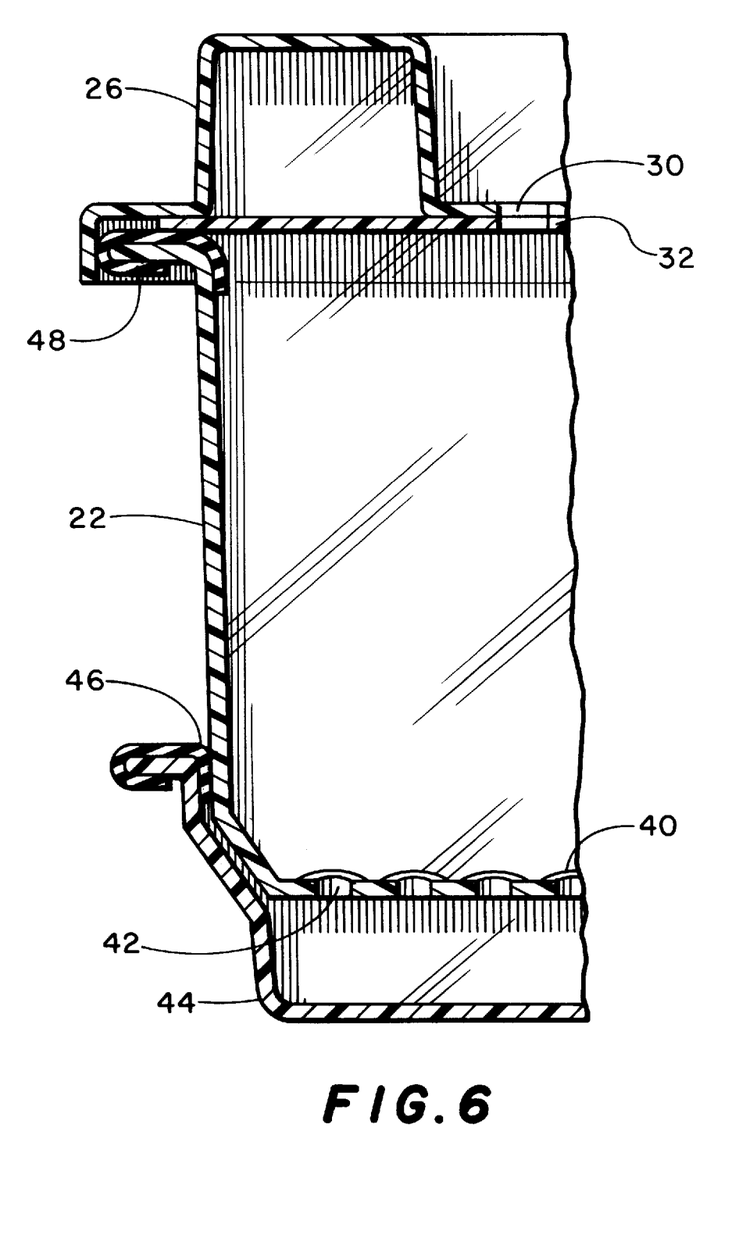
FIG. 6 is a partial cross section view of the cage showing the sealant means.

Preferably, a gasket 46 is fitted between the waste tray 44 and the body 22 of the cage 10 and another gasket 48 between the lid and the body 22 of the cage 10 (FIG. 6). The waste tray 44 is attached onto the cage 10 and is easily installed and removed by applying pressure on the waste tray 44 to snap on and off over the gasket 46. In this manner the waste tray 44 can be easily replaced with a clean tray saving costly man hours. The gasket 48 and 46 may be any sealable closure between the body 22 and the lid 26 and the body and the waste tray. By use of similar sealing techniques known to persons skilled in the art, each cage system is air tight and the air flow within each cage is restricted to the specific cage. There is no leakage of air from any cage into the room in which the cage is housed nor is there any air interchange between any cages. Cage to cage contamination is prevented.

The waste tray 44 further has an outlet port 50 formed therein through which the air exiting the cage 10, may flow. Also, water or liquid waste products from the animal may exit from the outlet port 50. The waste air, after flowing out of the outlet port 50 is directed preferably through a hose, to the exhaust filter 16 and the particulates and toxic gases are removed. Air is then resupplied through the inlet filter 16 to the cage system under an approximately neutral to slightly positive pressure. An adjustable blower 52 in the air supply system is used to control the rate of air flow as needed depending upon the desired conditions and the strain of animal within the cage. Due to the configuration of the cage system and the perforated lid 26 and perforated floor 24 of the individual cage, the air flow through each cage is laminar from the top of the cage to the bottom of the cage (FIGS. 2 and 3). In this manner, the animal is continuously provided with fresh air. The air, after passing through the body 22 of the cage 10, sweeps over any waste products which may be in the waste tray 44 and removes ammonia and other vapors from the system.

A water valve 54 is fitted into the body 22 of the cage 10 and is connected to a water supply 56. The water valve 54 may be manually or automatically controlled to supply the animal with water. The perforated floor 24 of the cage and the outlet port 50 of the waste tray 44 permit the water to drain from the cage and prevent flooding. The excess water flows to a reservoir 58 and to a drain to be removed from the system.

FIG. 3 diagrammatically depicts the air flow in the system by arrows having longer shafts and the water flow by arrows having shorter shafts.

The cages 10 may be made in a variety of sizes to accommodate laboratory animals of varying sizes.

The intracage airflow system serves as an effective barrier system by preventing the transmission of contaminated particulates and aerosols from cage-to-cage and rack-to-rack. The system uses airflow to prevent or control airborne infection of laboratory animals. The flow of air sweeps the bedding-free cage of gases, particulate matter, allergens and other contaminants down into the attached waste tray, keeping the cage environment cleaner than other filtered air cage designs. The HEPA filter (both supply and exhaust) is connected to a baffling system which reduces turbulence and directs the airflow into a distribution plate. This plate houses the connections for the flexible tubing that act as a plenum and either delivers or exhausts air from each cage. Preferably, each tube is of equal length thus supplying or exhausting each cage the same no matter where it is located on the rack. Each tube is housed in a hollow shelf and preferably terminated at the cage with a stainless steel nipple. The air flow to each individual cage is automatically balanced to provide approximately the same air flow into each cage in the system. This may be accomplished by controlling the lengths of the tubing, baffles, varying duct size and other means known to persons skilled in the art.

Devices may be secured (snap-on) to the perforated floor. These devices are made from appropriate non-toxic material that favors isolation, nest building and thigmotactic behaviors, as well as providing protective or escape mechanisms for submissive animals. The bedding-free environment prevents the secondary dust problem of using conventional bedding material. Additionally, the elimination of bedding results in considerable cost savings. A central HEPA filtering unit may be mounted on each rack, room mounted to supply several racks or centrally located in a facility to supply many rooms with racks. These systems are all equipped with visual and audible alarms and monitors to alert facility personnel of problems or failures of air flow, temperature, humidity, water leakage, or filters. A battery-operated power supply system can be provided in the event of a power failure.

In summary, the cage system of the present invention provides the following unique features:

bedding free cage uses a perforated floor a plenum lid the lid has spaced-apart orifices for air flow an adjustable blower to vary the air supply and exhaust unit can accommodate various animal strains by user adjusted airflow separates air and water from the exhaust (prevents cage flooding)

air is supplied into top of cage and removed at bottom. Air flow direction is laminarly downward.

a snap-on waste tray is provided closed system maintains an approximately neutral pressure in the cage airflow is delivered and exhausted via a unique distribution system which automatically balances the airflow in each cage maintains and monitors temperature and humidity at cage level snap-on enrichment devices battery back-up for the HEPA unit monitors and alarms when problems occur centralized air supply at room or facility level uses non-toxic material or devices for nesting sealed cages.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A ventilated cage system for laboratory animal care comprising:

a plurality of individual cages mounted in a rack, each cage having an integral body, a separate lid connected thereto, each lid having a bottom surface having a plurality of orifices formed therein, an inlet port being formed in each lid, each body having a perforated floor, each cage having a detachable waste tray connected beneath the perforated floor, wherein each cage is air tight, an outlet port formed in the waste tray, an air supply having a filter therein, the air supply introducing filtered air into the inlet port of the respective lid of each cage, the air flowing laminarly from the lid of each cage, through each cage, through the perforated floor of each cage, through the waste tray of each cage, through the outlet port of each waste tray and through the filter wherein fresh filtered air is maintained in each cage, waste air is removed from each cage and cage-to-cage contamination is prevented.

2. The cage system of claim 1, further comprising a feeder plate disposed between the lid and the body of the cage acting as an air diffuser.

3. The cage system of claim 2, wherein the feeder plate has means thereon to retain a water container and a holder for food for the laboratory animal.

4. The cage system of claim 1, wherein an air tight seal is provided between the body and the lid and the body and the waste tray.

5. The cage system of claim 1, wherein the filter in the air supply removes particulate matter and pathogens larger than 0.003 microns in size.

6. The cage system of claim 1, wherein the perforated floor of the body has a plurality of raised domes, each dome disposed among a plurality of surrounding perforations wherein solid and liquid waste are deflected off the domes through the plurality of surrounding perforations into the waste tray and wherein the laboratory animal within the cage is not housed with the waste.

7. The cage system of claim 1, further having a water supply, the water supply being connected to a valve fitted in the body of the cage.

8. The cage system of claim 1, further comprising an adjustable air supply and exhaust wherein the air flow can be adjusted.

9. A cage for laboratory animal care, the cage not requiring bedding therein, the cage comprising:

a body having four walls and a bottom surface defining living space for the animal, the bottom surface having a plurality of spaced-apart perforations formed therein, a waste tray detachably connected beneath the perforated floor of the body, the waste tray having an outlet port formed therein, a lid connected to the body, the lid having a bottom surface having a plurality of spaced-apart orifices formed therein, the orifices communicating with the living space for the animal, the lid having an inlet port formed therein, and a clean air supply connected to the inlet port wherein the clean air flows through the inlet port into the lid and through the orifices in the bottom surface of the lid, the clean air flowing laminarly through the living space for the animal through the perforated floor, across the waste tray and out the outlet port, the air flow removing from the cage, particulate matter, allergens and gases associated with waste products.

10. The cage of claim 9, further comprising a valve fitted in the body of the cage, the valve being connected to a supply of water.

11. The cage of claim 9, further comprising a perforated feeder plate disposed between the lid and the body of the cage acting as a diffuser.

12. The cage of claim 11, wherein the perforated feeder plate has means thereon to retain a water container and a holder for food for the laboratory animal.

13. The cage of claim 9, wherein an adjustable blower is provided in the clean air supply to control the rate of air flow through the cage.

14. The cage of claim 9, wherein the cage is a closed air system and an approximately neutral pressure is maintained in the cage.

15. The cage of claim 9, wherein the perforated floor has a plurality of raised domes, each dome disposed among a plurality of surrounding perforations wherein solid and liquid waste are deflected from the domes through the plurality of surrounding perforations into the waste tray, there being no bedding to trap the waste, and wherein the laboratory animal within the cage is not housed with the waste.

* * * * *

UNITED STATES PATENT AND TRADEMARK OFFICE
CERTIFICATE OF CORRECTION

PATENT NO. : 5,865,144
DATED : February 2, 1999
INVENTOR(S) : Semenuk et al

It is certified that error appears in the above-identified patent and that said Letters Patent is hereby corrected as shown below:

On the title page, item [76], add:

Richard A. Norwood, 1501 Doxbury Road, Towson, MD 21286

Signed and Sealed this

Thirty-first Day of August, 1999

Attest:

Q. TODD DICKINSON

*Attesting Officer*     *Acting Commissioner of Patents and Trademarks*